(12) United States Patent
Chakrabarti et al.

(10) Patent No.: US 11,536,144 B2
(45) Date of Patent: Dec. 27, 2022

(54) ROTOR BLADE DAMPING STRUCTURES

(71) Applicant: General Electric Company, Schenectady, NY (US)

(72) Inventors: Suryarghya Chakrabarti, Mason, OH (US); Jing Li, Niskayuna, NY (US); John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/038,601

(22) Filed: Sep. 30, 2020

(65) Prior Publication Data
US 2022/0098989 A1   Mar. 31, 2022

(51) Int. Cl.
*F01D 5/22*   (2006.01)

(52) U.S. Cl.
CPC ........ *F01D 5/225* (2013.01); *F05D 2240/305* (2013.01); *F05D 2240/306* (2013.01); *F05D 2240/80* (2013.01); *F05D 2260/96* (2013.01)

(58) Field of Classification Search
CPC . F01D 5/225; F01D 5/26; F01D 25/06; F05D 2240/305; F05D 2240/306; F05D 2240/80; F05D 2260/96
See application file for complete search history.

(56) References Cited

U.S. PATENT DOCUMENTS

| 1,833,754 A | 11/1931 | Paget |
| 2,349,187 A | 5/1944 | Meyer |
| 2,689,107 A | 9/1954 | Odegaard |
| 2,984,453 A | 5/1961 | Heymann |
| 3,576,377 A | 4/1971 | Beanland et al. |

(Continued)

FOREIGN PATENT DOCUMENTS

| CN | 103321853 B | 3/2016 |
| DK | 177924 B1 | 1/2015 |

(Continued)

OTHER PUBLICATIONS

Giridhar et al., Gas Turbine Blade Damper Optimization Methodology, Advances in Acoustics and Vibration, Article ID 316761, vol. 2012, pp. 1-13.

(Continued)

*Primary Examiner* — Courtney D Heinle
*Assistant Examiner* — Danielle M. Christensen
(74) *Attorney, Agent, or Firm* — Dority & Manning, P.A.

(57) ABSTRACT

A rotor blade assembly includes a first rotor blade and a second rotor blade positioned adjacent to one another. The first rotor blade and the second rotor blade each include a platform and an airfoil extending radially outward from a root coupled to the platform to a tip. The airfoil includes a part-span shroud. The part-span shroud extends from the airfoil and is disposed between the root and the tip. The part-span shroud includes a pressure side portion extending from the pressure side surface and a suction side portion extending from the suction side surface. A damper is in contact with both the part span shroud of the first rotor blade and the part span shroud of the second rotor blade at an interference joint. The damper is movable relative to the part span shroud of both the first rotor blade and the second rotor blade.

9 Claims, 11 Drawing Sheets

(56) References Cited

U.S. PATENT DOCUMENTS

| | | | |
|---|---|---|---|
| 3,893,782 A | 7/1975 | Pierpoline et al. | |
| 3,966,357 A | 6/1976 | Corsmeier | |
| 3,986,792 A | 10/1976 | Warner | |
| 3,990,813 A * | 11/1976 | Imai | F01D 5/22 416/196 R |
| 4,386,887 A | 6/1983 | Ortolano | |
| 4,460,314 A | 7/1984 | Fuller | |
| 5,165,860 A | 11/1992 | Stoner et al. | |
| 5,219,144 A | 6/1993 | Fox et al. | |
| 5,232,344 A | 8/1993 | El-Aini | |
| 5,407,321 A | 4/1995 | Rimkunas et al. | |
| 5,449,152 A | 9/1995 | Byrnes et al. | |
| 5,498,137 A | 3/1996 | El-Aini et al. | |
| 5,522,705 A | 6/1996 | Elaini et al. | |
| 5,599,165 A | 2/1997 | Elaini et al. | |
| 5,730,584 A | 3/1998 | Dodd | |
| 6,039,542 A | 3/2000 | Schilling et al. | |
| 6,155,789 A | 12/2000 | Mannava et al. | |
| 6,193,465 B1 | 2/2001 | Liotta et al. | |
| 6,224,341 B1 | 5/2001 | Fricke | |
| 6,283,707 B1 | 9/2001 | Chin | |
| 6,371,727 B1 | 4/2002 | Stangeland et al. | |
| 6,514,040 B2 | 2/2003 | Lewis et al. | |
| 6,607,359 B2 | 8/2003 | von Flotow | |
| 6,669,447 B2 | 12/2003 | Norris et al. | |
| 6,685,435 B2 | 2/2004 | Davis et al. | |
| 6,752,594 B2 | 6/2004 | Miller et al. | |
| 6,827,551 B1 | 12/2004 | Duffy et al. | |
| 6,979,180 B2 | 12/2005 | Motherwell | |
| 7,070,390 B2 | 7/2006 | Powell | |
| 7,104,758 B2 * | 9/2006 | Brock | F01D 5/225 416/190 |
| 7,217,093 B2 | 5/2007 | Propheter et al. | |
| 7,270,517 B2 | 9/2007 | Gamer | |
| 7,300,256 B2 | 11/2007 | Masserey et al. | |
| 7,347,664 B2 | 3/2008 | Kayser et al. | |
| 7,413,405 B2 | 8/2008 | Busbey et al. | |
| 7,736,124 B2 | 6/2010 | Bauer et al. | |
| 7,811,063 B2 | 10/2010 | Bonnet | |
| 7,824,158 B2 | 11/2010 | Bauer et al. | |
| 7,955,054 B2 | 6/2011 | El-Aini et al. | |
| 8,105,039 B1 | 1/2012 | El-Aini et al. | |
| 8,172,541 B2 | 5/2012 | Cairo | |
| 8,182,228 B2 * | 5/2012 | Riley | F01D 5/16 416/193 R |
| 8,231,352 B2 | 7/2012 | Hunt et al. | |
| 8,267,662 B2 | 9/2012 | Patrick et al. | |
| 8,292,583 B2 | 10/2012 | Marra | |
| 8,568,088 B2 | 10/2013 | Richter | |
| 8,579,181 B2 | 11/2013 | Strother et al. | |
| 8,579,593 B2 | 11/2013 | Campbell et al. | |
| 8,596,980 B2 | 12/2013 | Miller | |
| 8,641,369 B2 | 2/2014 | Rodriguez | |
| 8,951,013 B2 | 2/2015 | Miller et al. | |
| 9,011,104 B2 | 4/2015 | Delvaux et al. | |
| 9,121,288 B2 | 9/2015 | Campbell et al. | |
| 9,249,668 B2 | 2/2016 | Fisk et al. | |
| 9,334,740 B2 | 5/2016 | Kellerer et al. | |
| 9,399,920 B2 | 7/2016 | Miller et al. | |
| 9,574,450 B2 | 2/2017 | Spracher et al. | |
| 9,587,496 B2 | 3/2017 | Collins et al. | |
| 9,879,551 B2 | 1/2018 | Blaney et al. | |
| 10,021,779 B1 | 7/2018 | Hart | |
| 10,132,169 B2 | 11/2018 | McDufford | |
| 10,196,908 B2 | 2/2019 | Bielek et al. | |
| 10,221,699 B2 | 3/2019 | McDufford et al. | |
| 10,287,895 B2 | 5/2019 | McDufford | |
| 10,316,670 B2 | 6/2019 | Morris et al. | |
| 2004/0253115 A1 | 12/2004 | Williams et al. | |
| 2005/0047918 A1 | 3/2005 | Powell | |
| 2007/0110578 A1 | 5/2007 | Stommel | |
| 2007/0217918 A1 | 9/2007 | Baker et al. | |
| 2007/0253828 A1 | 11/2007 | Masserey et al. | |
| 2014/0023506 A1 | 1/2014 | Kleinow | |
| 2015/0176413 A1 | 6/2015 | Weber et al. | |
| 2015/0345296 A1 | 12/2015 | Davidson et al. | |
| 2015/0345307 A1 | 12/2015 | Davidson et al. | |
| 2015/0345309 A1 | 12/2015 | Davidson et al. | |
| 2016/0024940 A1 | 1/2016 | Wilber | |
| 2016/0084089 A1 | 3/2016 | Blaney et al. | |
| 2016/0108737 A1 | 4/2016 | Batt et al. | |
| 2016/0319669 A1 | 11/2016 | Morris et al. | |
| 2016/0341221 A1 | 11/2016 | Twelves, Jr. et al. | |
| 2018/0230818 A1 | 8/2018 | Chakrabarti et al. | |
| 2018/0258775 A1 | 9/2018 | Deallenbach et al. | |

FOREIGN PATENT DOCUMENTS

| | | |
|---|---|---|
| EP | 1640562 A1 | 3/2006 |
| EP | 1892377 A1 | 2/2008 |
| EP | 1980715 A1 | 10/2008 |
| EP | 2019188 A1 | 1/2009 |
| EP | 2584146 A1 | 4/2013 |
| EP | 2597265 A1 | 5/2013 |
| EP | 2851510 A1 | 3/2015 |
| EP | 3029268 A1 | 6/2016 |
| EP | 2840256 B1 | 12/2016 |
| FR | 3086693 A1 | 4/2020 |
| JP | S54112406 A | 9/1979 |
| JP | S58176402 A | 10/1983 |
| JP | 2002295201 A | 10/2002 |
| JP | 6278447 B2 | 2/2018 |
| JP | 6278448 B2 | 2/2018 |
| JP | 2018/135803 A | 8/2018 |
| WO | WO2010/025732 A3 | 3/2010 |
| WO | WO2013/162887 A1 | 10/2013 |
| WO | WO2015/085078 A1 | 6/2015 |
| WO | WO2017/146724 A1 | 8/2017 |

OTHER PUBLICATIONS

Wang et al., Dynamic Characteristics of Blade with Viscoelastic Damping Block Based on Complex Eigenvalue Method, Shock and Vibration, Article ID 5068901, vol. 2018, pp. 1-16.

Zhang et al., Edgewise Vibration Control of Wind Turbine Blades Using Roller and Liquid Dampers, Journal of Physics Conference Series, vol. 524, 2014, pp. 01-11.

Zhang et al., Mitigation of Edgewise Vibrations in Wind Turbine Blades by Means of Roller Dampers, Journal of Sound and Vibration, vol. 333, 2014, pp. 5283-5298.

European Search Report corresponding to Application No. 21196724 dated Nov. 5, 2021.

* cited by examiner

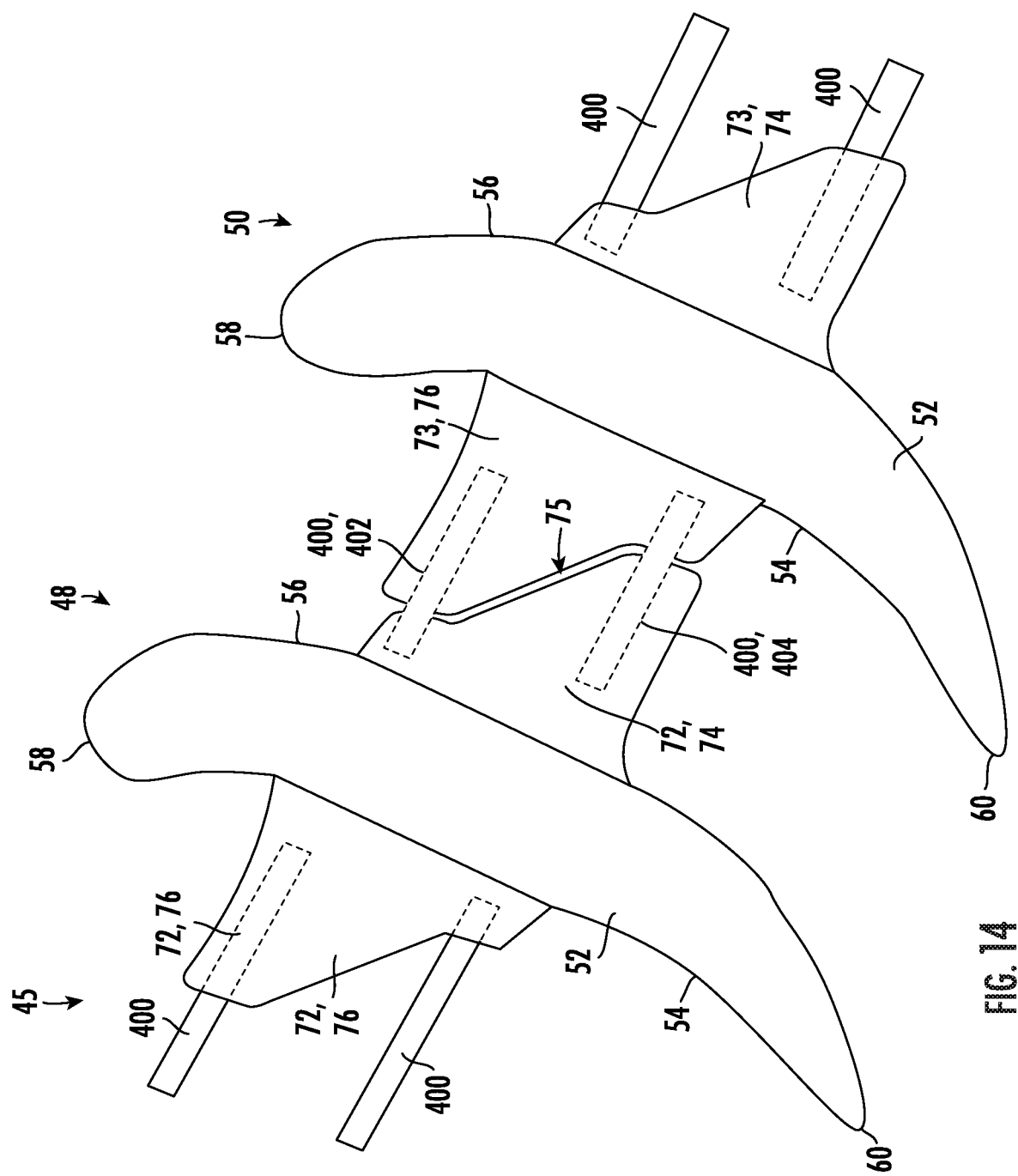

ROTOR BLADE DAMPING STRUCTURES

STATEMENT REGARDING FEDERALLY SPONSORED RESEARCH OR DEVELOPMENT

This invention was made with Government support under Contract No. DE-FE0031613 awarded by the United States Department of Energy. The Government has certain rights in this invention.

FIELD

The present disclosure relates generally to turbomachine rotor blades. Specifically, the present disclosure relates to structures for damping vibrations in a turbomachine rotor blade assembly.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Typically, turbomachine rotor blades are exposed to unsteady aerodynamic loading which causes the rotor blades to vibrate. If these vibrations are not adequately damped, they may cause high cycle fatigue and premature failure in the blades. Of all the turbine stages, the last-stage blade (LSB) is the tallest and therefore is the most vibrationally challenged component of the turbine. Conventional vibration damping methods for turbine blades include platform dampers, damping wires, shrouds etc.

Platform dampers sit underneath the blade platform and are effective for medium and long shank blades which have motion at the blade platform. IGT aft-stage blades have short shanks to reduce the weight of the blade and in turn reduce the pull load on the rotor which renders platform dampers ineffective.

Generally, turbomachine rotor blades get their damping primarily from the shrouds. Shrouds can be at the blade tip (tip-shroud) or at a partial span between the hub and tip (part-span shroud). These shrouds contact against adjacent blades and provide damping when they rub against each other.

In many cases, the part-span shroud contact load may be too high which prevents the part-span shroud contact surfaces from sliding and providing damping. One solution to this issue is adding a second part span shroud to share the contact load. While this works for improving damping, it comes at the cost of added weight and performance debit due to added blockage in the flowpath. It is therefore beneficial to have damping technologies which improve the damping without an excessive blockage to the flowpath. Additionally, while a traditional nub-sleeve damper may provide adequate vibrational damping, it comes at the cost of a loss in stiffness due to the lack of shroud to shroud contact, which makes frequency avoidance difficult.

Accordingly, a system that provides vibrational damping to the rotor blades without a loss of stiffness and without creating a large blockage in the flowpath is desired in the art.

BRIEF DESCRIPTION

Aspects and advantages of the rotor blade assemblies and turbomachines in accordance with the present disclosure will be set forth in part in the following description, or may be obvious from the description, or may be learned through practice of the technology.

In accordance with one embodiment, a rotor blade assembly for a turbomachine is provided. The rotor blade assembly includes a first rotor blade and a second rotor blade positioned adjacent to one another. The first rotor blade and the second rotor blade each include a platform and an airfoil extending radially outward from a root coupled to the platform to a tip. The airfoil includes a pressure side surface, a suction side surface, and a part-span shroud. The part-span shroud extends from the airfoil and is disposed between the root and the tip. The part-span shroud includes a pressure side portion extending from the pressure side surface and a suction side portion extending from the suction side surface. The suction side portion of the part-span shroud of the first rotor blade and the pressure side portion of the part-span shroud of the second rotor blade form an interface joint with one another. A damper is in contact with both the part span shroud of the first rotor blade and the part span shroud of the second rotor blade at the interface joint. The damper is movable relative to the part span shroud of both the first rotor blade and the second rotor blade.

In accordance with another embodiment, a turbomachine is provided. The turbomachine includes a compressor section, a combustor section, and a turbine section. A rotor disk is provided in one of the compressor section or the turbine section. A first rotor blade and a second rotor blade mounted on the rotor disk adjacent to one another. The first rotor blade and second rotor blade each include a platform and an airfoil extending radially outward from a root coupled to the platform to a tip. The airfoil includes a pressure side surface, a suction side surface, and a part-span shroud. The part-span shroud extends from the airfoil and is disposed between the root and the tip. The part-span shroud includes a pressure side portion extending from the pressure side surface and a suction side portion extending from the suction side surface. The suction side portion of the part-span shroud of the first rotor blade and the pressure side portion of the part-span shroud of the second rotor blade form an interface joint with one another. A damper is in contact with both the part span shroud of the first rotor blade and the part span shroud of the second rotor blade at the interface joint. The damper is movable relative to the part span shroud of both the first rotor blade and the second rotor blade.

These and other features, aspects and advantages of the present rotor blade assemblies and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present rotor blade assemblies and turbomachines, including the best mode of making and using the present systems and methods, directed to one of ordinary skill in the art, is set forth in the specification, which makes reference to the appended figures, in which:

FIG. 14 illustrates a top-down view of a rotor assembly having pin dampers, in accordance with embodiments of the present disclosure.

DETAILED DESCRIPTION

Figure 1:
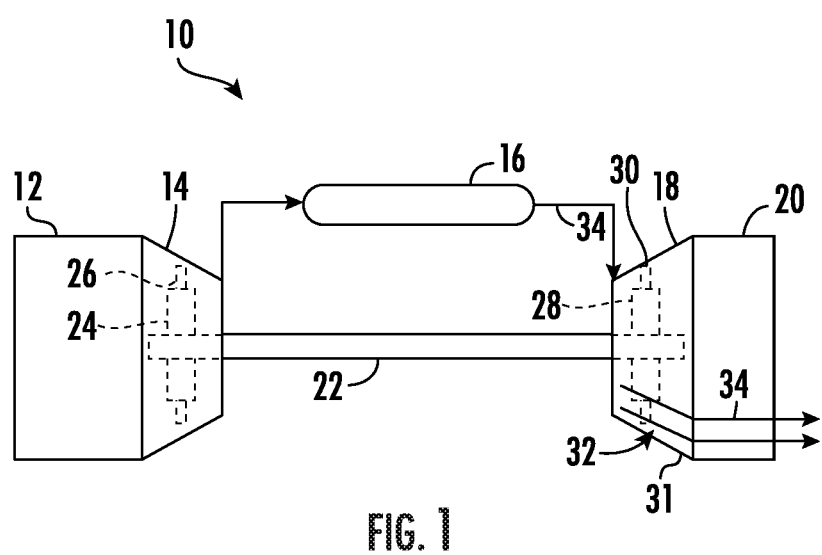
FIG. 1 is a schematic illustration of a turbomachine in accordance with embodiments of the present disclosure.

Reference now will be made in detail to embodiments of the present rotor blade assemblies and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
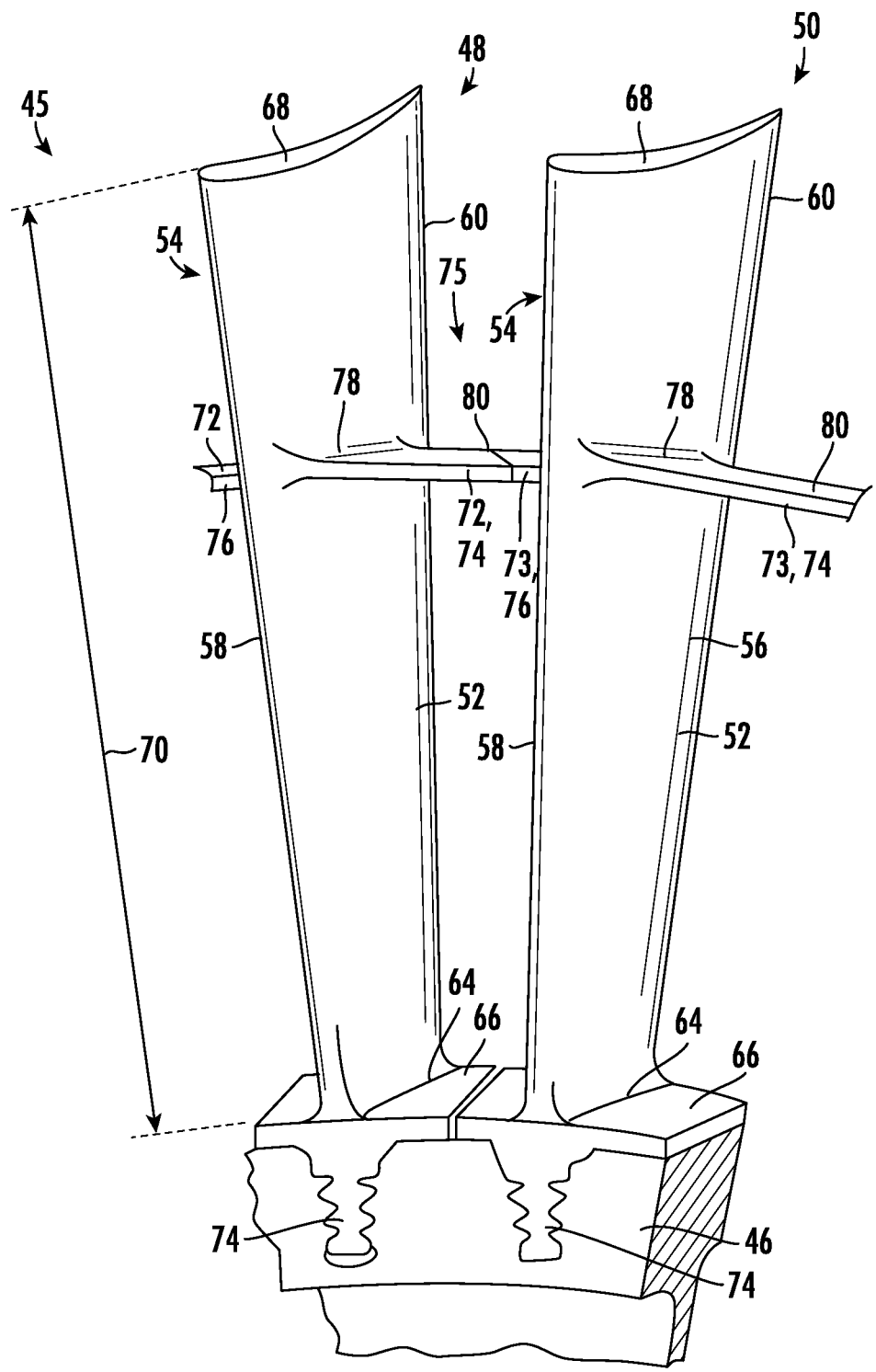
FIG. 2 illustrates a perspective view of a rotor blade assembly, in accordance with embodiments of the present disclosure.
Figure 3:
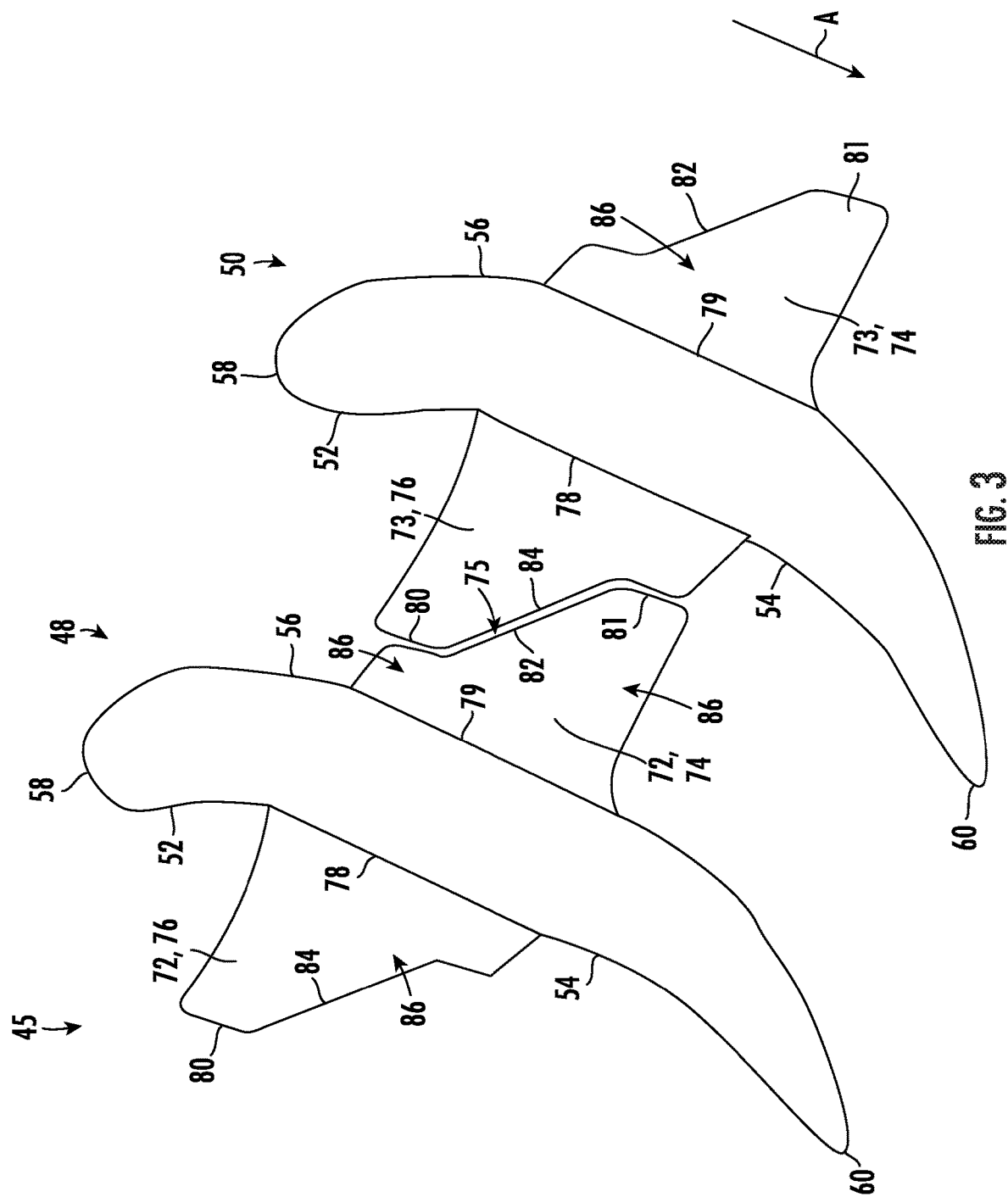
FIG. 3 illustrates a top-down plan view of the rotor assembly shown in FIG. 2, in accordance with embodiments of the present disclosure.

FIG. 2 provides a perspective view of a rotor blade assembly 45 as may be incorporated in any stage of the turbine section 18 or the compressor section 14, and FIG. 3 is a top-down plan view of the rotor assembly 45, in accordance with embodiments of the present disclosure. In exemplary embodiments, the rotor blade assembly 45 may for use within the turbine section 18. As shown in FIGS. 2 and 3 collectively, the turbine rotor blade assembly 45 includes a rotor disk 46, which may be representative of the either the rotor disk 24 and/or the rotor disk 28 described herein. A first rotor blade 48 and a second rotor blade may position adjacent to one another and mounted to the rotor disk 46. In exemplary embodiments, the first rotor blade 48 and the second rotor blade 50 may be positioned immediately adjacent to one another, such that no rotor blades are between the first rotor blade 48 and the second rotor blade 50.

In particular configurations, each of the rotor blades 48, 50 may include a mounting portion 74 (such as a dovetail joint), which is formed to connect and/or to secure the rotor blades 48, 50 to the rotor disk 46. As shown in FIG. 2, each of the rotor blades 48, 50 may include a platform 66 and an airfoil 52 extending from the platform 66. In many embodiments, the airfoil 52 may extend radially outward from the platform with respect to the axial centerline of the gas turbine 10. In various embodiments, the airfoil 52 includes a pressure side surface 54 and an opposing suction side surface 56. The pressure side surface 54 and the suction side surface 56 meet or intersect at a leading edge 58 and a trailing edge 60 of the airfoil 52. The leading edge 58 and the trailing edge 60 may be spaced apart from one another and define the terminal ends of the airfoil 52 in the axial direction. A chord line (not shown) extends between the leading edge 58 and the trailing edge 60 such that pressure and suction side surfaces 54, 56 extend in chord or chordwise between the leading edge 58 and the trailing edge 60.

In many embodiments, the pressure side surface 54 generally defines an aerodynamic, concave external surface of the airfoil 52. Similarly, the suction side surface 56 may generally defines an aerodynamic, convex external surface of the airfoil 52. The leading edge 58 of airfoil 52 may be the first portion of the airfoil 52 to engage, i.e., be exposed to, the combustion gases along the hot gas path 32. The combustion gases may be guided along the aerodynamic contour of airfoil 52, i.e., along the suction side surface 56 and pressure side surface 54, before being exhausted at the trailing edge 60.

As shown in FIG. 2, the airfoil 52 includes a root or first end 64, which intersects with and extends radially outwardly from a platform 66 of the turbine rotor blade 50. The airfoil 52 terminates radially at a second end or tip 68 of the airfoil 52. The root 64 of the airfoil 52 may be defined at an intersection between the airfoil 52 and the platform 66. The tip 68 is disposed radially opposite the root 64. As such, the tip 68 may generally define the radially outermost portion of the rotor blade 50 and, thus, may be configured to be positioned adjacent to a stationary shroud or seal (not shown) of the turbine section 18.

The pressure and suction side surfaces 54, 56 extend in span and define a span length 70 of the airfoil 52 between the root 64 and/or the platform 66 and the tip 68 of the airfoil 52. In other words, each rotor blade 50 includes an airfoil 52 having opposing pressure and suction side surfaces 54, 56 that extend in chord or chordwise between opposing leading and trailing edges 58, 60 and that extend in span or spanwise 70 between the root 64 and the tip 68 of the airfoil 52.

The span length 70 may be measured from the root 64 to the tip 68 of the airfoil 52. A percentage of the span length 70 may be used to indicate a position along the span length 70. For example, "0% span" may refer to the root 64 of the airfoil 52. Similarly, "100% span" may refer the tip 68 of the airfoil. In this way, the term partial span or "part-span" may refer to a location along the span length 70 that is between but not including 0% span and 100% span.

As shown in FIGS. 2 and 3 collectively, the first rotor blade 48 may include a first part-span shroud 72, and the second rotor blade 50 may include a second part-span shroud 73. Each of the part span shrouds 72, 73 may extend from the respective airfoils 52 of the rotor blades 48, 52. In many embodiments, the part span shrouds 72, 73 may each be disposed between the root 64 and the tip 68 of the respective airfoils 52. For example, the part-span shrouds 72 and 73 of the rotor blades 48 and 50 may be disposed in a common location along the length of the respective airfoils 52, e.g., between the root 64 and the tip 68 of the airfoils 52. In many embodiments, the part-span shrouds 72, 73 may be spaced apart from both the root 64 and the tip 68 of the respective airfoils 52. The part-span shrouds 72, 73 may be used to connect the adjacent rotor blades 48, 50. The linking of the adjacent rotor blades 48, 50 may advantageously damp operational vibrations experienced by the rotor blades 48, 50, which means rotor blades 48, 50 are subject to less mechanical stress during operation and degrade more slowly.

In many embodiments, the first part-span shroud 72 and the second part span shroud 73 may each include a pressure side portion 76 that extends from the pressure side surface 54 and a suction side portion 74 that extends from the suction side surface 56. As shown, the pressure side portion 76 of the part-span shroud 72 of the first rotor blade 48 couples to the suction side portion 74 of the part-span shroud 73 of the second rotor blade 50. In many embodiments, the pressure side portion 76 and the suction side portion 74 of each part-span shroud 72, 73 may extend opposite one another and couple to the part-span shroud 72, 73 of a neighboring rotor blade 48, 50. In various embodiments, both the pressure side portion 76 and the suction side portion 74 are cantilevered, such that they extend from respective attachment ends 78, 79 connected to the airfoil 52 to free ends 80, 81 that are remote from the airfoil 52. In this way, the free end 80 of the pressure side portion 76 of the first part-span shroud 72 of the first rotor blade 48 is disposed at least proximate to the free end 81 of the suction side portion 74 of the second part span shroud 73 of the second rotor blade 50. In exemplary embodiments, when the rotor assembly is fully assembled, the part-span shrouds 72, 73 of the rotor blades 48, 50 may extend circumferentially and define a shroud ring that is concentric with the rotor disc 46.

As shown in FIG. 3, both the suction side portion 74 and the pressure side portion 76 of the part-span shrouds 72, 73 may each include a respective contact surface 82, 84 that are oriented opposite one another. For example, the contact surface 82 of the suction side portion 74 of the first part span shroud 72 may extend from the attachment end 79 to the free end 81 generally oblique to the axial direction. Similarly, the contact surface 84 of the pressure side portion 76 of the second part span shroud 73 may extend from the attachment end 78 to the free end 80 generally oblique to the axial direction. As shown in FIG. 3, the contact surface 82 of the suction side portion 74 of the first part span shroud 72 may correspond to, and contact, the contact surface 84 of the pressure side portion 76 of the second part-span shroud 73, in order to couple the rotor blades 48, 50 together. In many embodiments, the contact surfaces 82 and 84 may be movable relative to one another. For example, during operation of the gas turbine 10, the contact surfaces 82 and 84 may rub against each other, in order to frictionally dissipate potential damage-causing vibrations of the rotor blades 48, 50.

In many embodiments, the suction side portion 74 of the first part-span shroud 72 of the first rotor blade 48 and the pressure side portion 76 of the second part-span shroud 73 of the second rotor blade 50 may form an interface joint 75 with one another. For example, during operation of the gas turbine 10, the suction side portion 74 of the first part-span shroud 72 and the pressure side portion 76 of the part-span shroud 73 may rub against each other at the interference joint 75 (which is disposed between the part-span shrouds 72, 73), in order to frictionally dissipate potential damage-causing vibrations of the rotor blades 48, 50.

In exemplary embodiments, one or more dampers, such as the sleeve dampers 100, insert dampers 200, and/or pin dampers 400 described herein, may be in contact with both the part-span shrouds 72, 73 at the interference joint 75, in order to advantageously increase the vibrational damping of the part-span shrouds 72, 73 and prolong the overall life of the rotor blades 48, 50. For example, in many embodiments, the dampers may be movable relative to the first part span shroud 72 of the first rotor blade 48 and the second part span shroud 73 of the second rotor blade 50, in order to frictionally dissipate the vibrations of the rotor blades 48, 50. In exemplary embodiments, the dampers may be movable and/or slidable relative to the first part-span shroud 72 of the first rotor blade 48 and the second part-span shroud 73 of the second rotor blade 50, in order to frictionally dissipate the vibrations of the rotor blades 48, 50.

Figure 4:
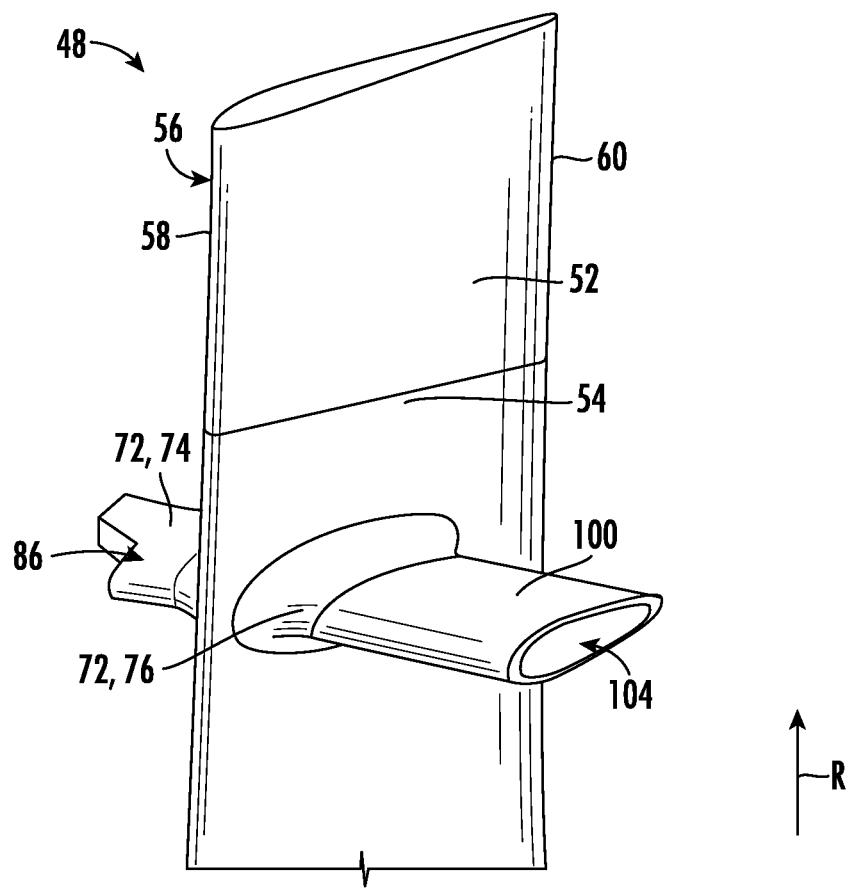
FIG. 4 illustrates an enlarged perspective view of an airfoil, in accordance with embodiments of the present disclosure.
Figure 5:
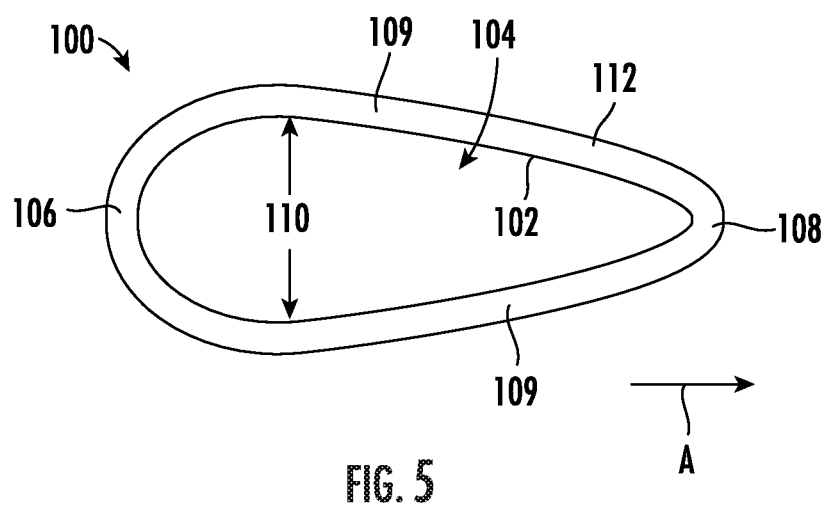
FIG. 5 illustrates a cross-sectional side view of a damper sleeve, in accordance with embodiments of the present disclosure.

FIG. 4 illustrates an enlarged perspective view of a first rotor blade 48, in accordance with embodiments of the present disclosure. As shown, a sleeve damper 100 may be slidably coupled to the part-span shroud 72 of the airfoil 52, such that the sleeve damper 100 is capable of movement relative the part-span shroud 72. In many embodiments, the sleeve damper 100 may be a hollow component that surrounds the part-span shroud 72. For example, the sleeve damper 100 may encompass the part span shroud 72 in the axial and radial directions. In various embodiments, the sleeve damper 100 may have a shape that corresponds with (or mimics) the exterior shape of the part span shroud 72. As shown in FIG. 5, which illustrates a cross sectional view of the sleeve damper 100, the damper sleeve 100 may include an inner surface 102 that corresponds with (or mimics) an exterior surface 86 of the part span shroud 72, in order to contact the entirety of the part span shroud 72 to better leverage movement between rotor blades 48, 50 and frictionally dissipate vibrations.

As shown in FIG. 5 the sleeve damper 100 may define a teardrop shaped opening 104. For example, the sleeve damper 100 may include a leading edge 106 having a generally rounded shape, trailing edge 108 having a generally rounded shape and axially separated from the leading edge, and a pair of sides 109 that extend generally straight between the leading edge 106 and the trailing edge 108. Both the leading edge 106 and the trailing edge 108 of the sleeve damper 100 may be generally rounded, semi-circular, shapes that form the axial ends of the sleeve damper 100. In many embodiments, a width 110 of the sleeve damper 100 may taper from the leading edge 106 to the trailing edge 108 of the sleeve damper 100, such that the pair of sides 109 generally converge towards one another in the axial direction A.

Figure 6:
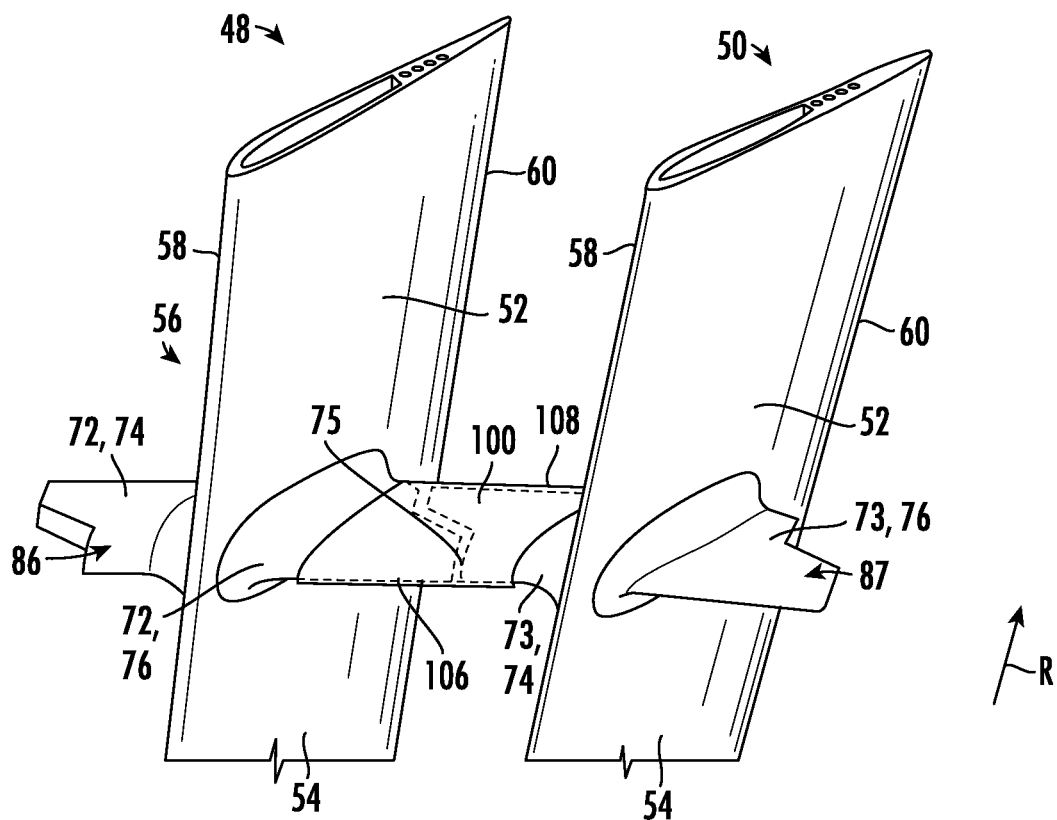
FIG. 6 illustrates a perspective view of a rotor blade assembly having a sleeve damper coupled thereto, in accordance with embodiments of the present disclosure.
Figure 7:
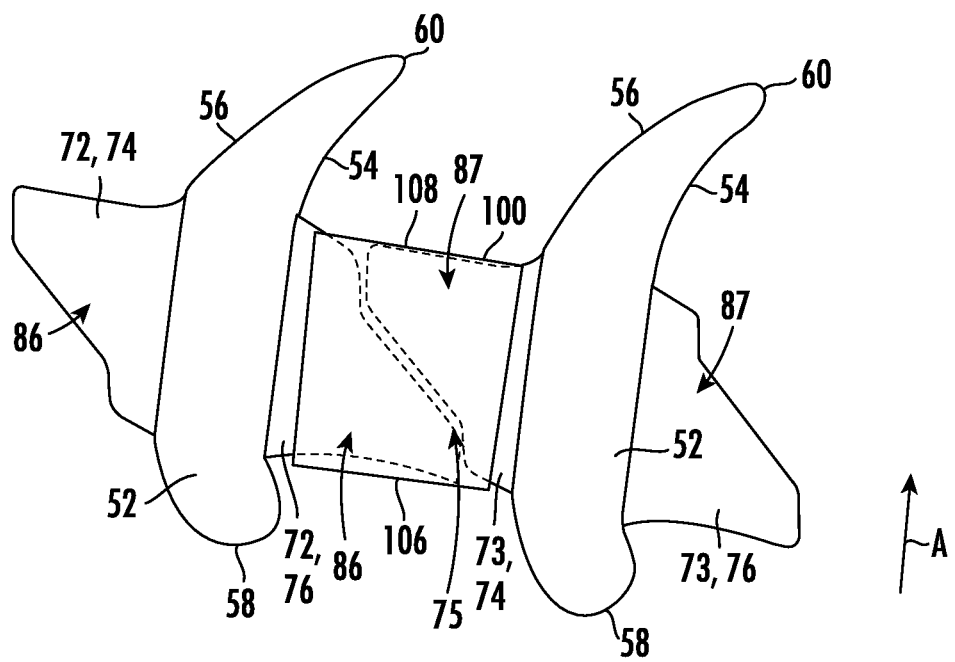
FIG. 7 is a top-down plan view of the rotor assembly shown in FIG. 6, in accordance with embodiments of the present disclosure.

FIG. 6 is a perspective view of a rotor blade assembly 45 having a sleeve damper 100 coupled thereto, and FIG. 7 is a top-down plan view of the rotor assembly 45 shown in FIG. 6, in accordance with embodiments of the present disclosure. As shown in FIGS. 6 and 7, the portion of the part-span shrouds 72, 73 that are covered by the damper sleeve 100 are shown in dashed lines for clarity. As shown, when the first rotor blade 48 and second rotor blade 50 are installed in the complete rotor assembly 45, the damper sleeve 100 may surround a portion of both the first part-span shroud 72 and a portion of the second part span shroud 73, such that the damper sleeve 100 partially contacts both the first and the second part-span shrouds 72, 73 of the rotor blades 48, 50. In this way, the damper sleeve 100 leverages the relative movement between the part span shrouds 72, 73 of the rotor blades 48, 50 to increase the frictional damping therebetween. In this way, the damper sleeve 100 is configured to advantageously reduce vibrations experienced by rotor blades 48, 50 during operation. For example, the damper sleeve 100 provides increased surface area in contact with both the part-span shrouds 72, 73, which advantageously increases the amount of frictional damping between the part-span shrouds 72, 73, thereby reducing the amount of potential damage causing vibrations to the rotor blades 48, 50.

In exemplary embodiments, the sleeve damper 100 may be in contact with an exterior surface 86 of the first part span shroud 72 and an exterior surface 87 of the second part span shroud 73, such that the sleeve damper 100 is positioned within, and directly exposed to, the flow of combustion gases 34. In such embodiments, the sleeve damper 100 may include an outer surface 112 that corresponds to the contour of the exterior surfaces 86, 87 of the part span shrouds 72, 73, in order to provide frictional damping to the rotor blades 48, 50 without creating an impediment (or blockage) to the flow of combustion gases 34 over the part-span shrouds 72, 73.

In particular embodiments, the sleeve damper 100 may surround the suction side portion 74 of the first part-span shroud 72 and the pressure side portion 76 of the second part-span shroud 73. As shown in FIG. 7, the sleeve damper 100 may extend between the suction side surface 56 of the first rotor blade 48 and the pressure side surface 54 of the second rotor blade 50. In this way, the suction side surface 56 and pressure side surface 54 of the neighboring rotor blades 48, 50 form a boundary for the sleeve damper 100. For example, the sleeve damper 100 may be movable and/or slidable on the exterior surfaces 86, 87 of the part span shrouds 72, 73 of the neighboring rotor blades 48, 50, but the suction side surface 56 and pressure side surface 54 of the airfoils 52 form a boundary that prevents the sleeve damper 100 from sliding too far and decoupling from the part-span shrouds 72, 73.

Figure 8:
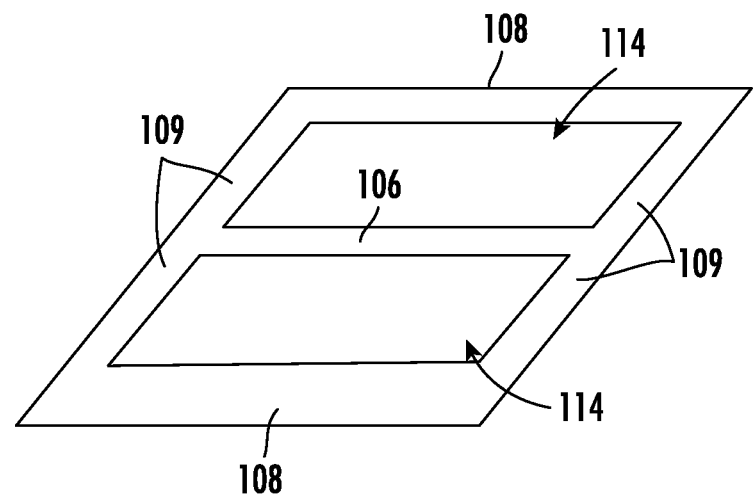
FIG. 8 illustrates a sleeve damper that has been unrolled, in accordance with embodiments of the present disclosure.

FIG. 8 illustrates an alternative embodiment of the sleeve damper 100, in which the sleeve has been unrolled, in order to illustrate the one or more cutouts or openings 114 that may be defined thereon. In such embodiments, the openings serve to advantageously reduce the weight of the sleeve damper 100. As shown in FIG. 8, the openings may be defined within the pair of sides 109 of the sleeve damper 100, in order to remove a large portion of the sleeve damper weight.

Figure 9:
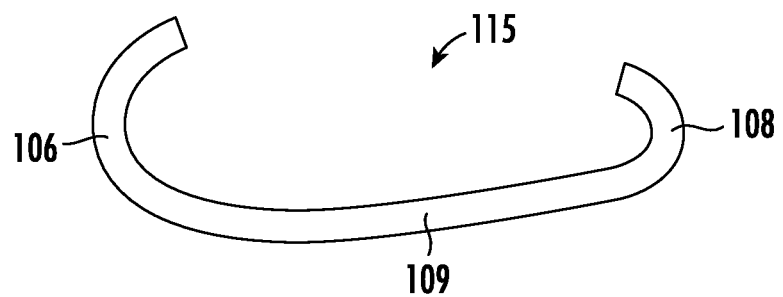
FIG. 9 illustrates a cross-sectional view of a sleeve damper, in accordance with embodiments of the present disclosure.

FIG. 9 illustrates a cross-sectional view of another alternative embodiment of the sleeve damper 100. As shown, one of the sides 109 of the pair of sides 109 may be entirely removed, in order to reduce the overall weight of the sleeve damper 100. In such embodiments, the sleeve damper 100 may only include one side 109 that extends between the leading edge 106 and the trailing edge 108. As shown, the sleeve damper 100 may define a gap 115 between the leading edge 106 and the trailing edge 108 of the sleeve damper 100.

Alternatively or additionally to the sleeve damper 100 described above, the rotor assembly 45 may further include an insert damper 200 that is in contact with both the first part-span shroud 72 of the first rotor blade 48 and the second part span shroud 73 of the second rotor blade 50, in order to advantageously increase the vibrational damping of the part-span shrouds 72, 73 and prolong the overall life of the rotor blades 48, 50. For example, the insert damper 200 may be in contact with only the interior surfaces of the part span shrouds 72, 73 of the rotor blades 48, 50, such that the insert damper 200 is not exposed to the combustion gases 34 passing over the exterior of the part span shrouds 72, 73.

Figure 10:
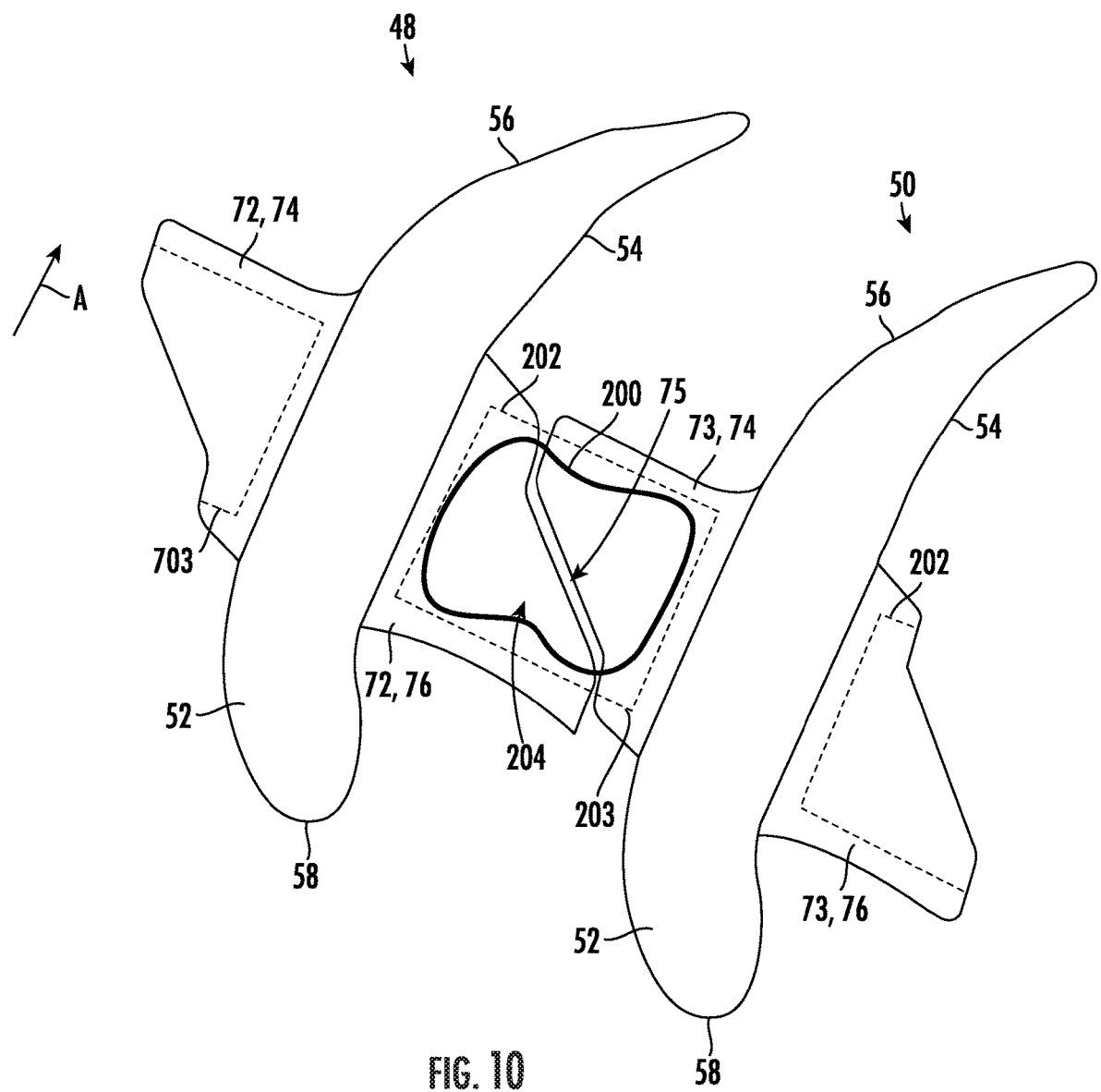
FIG. 10 illustrates a plan view of a rotor assembly having an insert damper, in accordance with embodiments of the present disclosure.

FIG. 10 illustrates an embodiment of a rotor assembly 45 having an insert damper 200, in accordance with embodiments of the present disclosure. As shown in FIG. 10, the first part-span shroud 72 of the first rotor blade 48 and the second part span shroud 73 of the rotor blade 50 may each define one or more internal cavities, e.g., a first internal cavity 202 defined within the pressure side portion 76 of the part-span shrouds 72, 73 and a second internal cavity 203 defined within the suction side portion 74 of the part-span shrouds 72, 73. As shown in FIG. 10, when the rotor blades 48, 50 are positioned next to one another on the rotor disk 46, the internal cavities 202, 203 of the part-span shrouds 72, 73 come together to form an internal chamber 204. For example, as shown, the pressure side portion 76 of the first part-span shroud 72 may link together with the suction side portion 74 of the second part-span shroud 73, such that the respective internal cavities 202, 203 align and form the internal chamber 204. One or more insert dampers 200 may be positioned within the internal chamber 204. For example, as shown, the one or more insert dampers 200 may extend between the first cavity 202 and the second cavity 203, such that the insert damper 200 contacts an internal surface of both the first part-span shroud 72 and an internal surface of the second part span shroud 73. In this way, the insert damper 200 is housed within the part-span shrouds 72 and 73, and in contact therewith, which advantageously allows the insert damper 200 to provide frictional damping to the rotor blade 48, 50 without creating an impediment to the flow of combustion gases 34.

Figure 11:
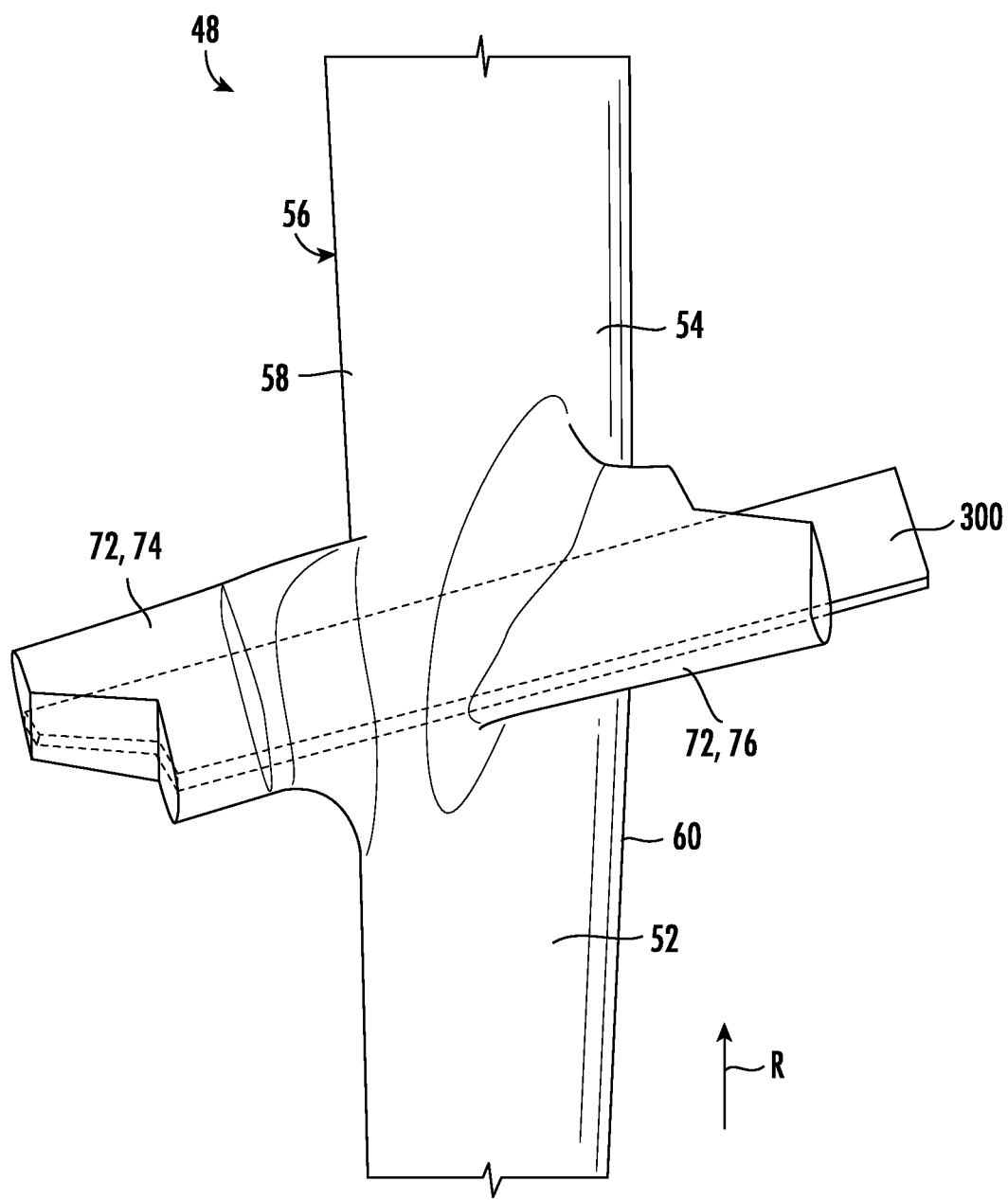
FIG. 11 illustrates a perspective view of a rotor blade having an insert damper positioned therein, in accordance with embodiments of the present disclosure.

FIG. 11 illustrates a perspective view of yet another embodiment of a first rotor blade 48 having an insert damper 300 positioned therein. Although only the first rotor blade 48 is shown in FIG. 11, it is understood that the features shown and described with reference to the first rotor blade 48 may be incorporated into the second rotor blade 50. As shown in FIG. 11, the insert damper 300 may extend through the entirety of the first part-span shroud 72. For example, as shown, the insert damper 300 may extend from the suction side portion 76 of the part span shroud 72, through the airfoil 52, to the pressure side portion 74 of the part span shroud 72.

Figure 12:
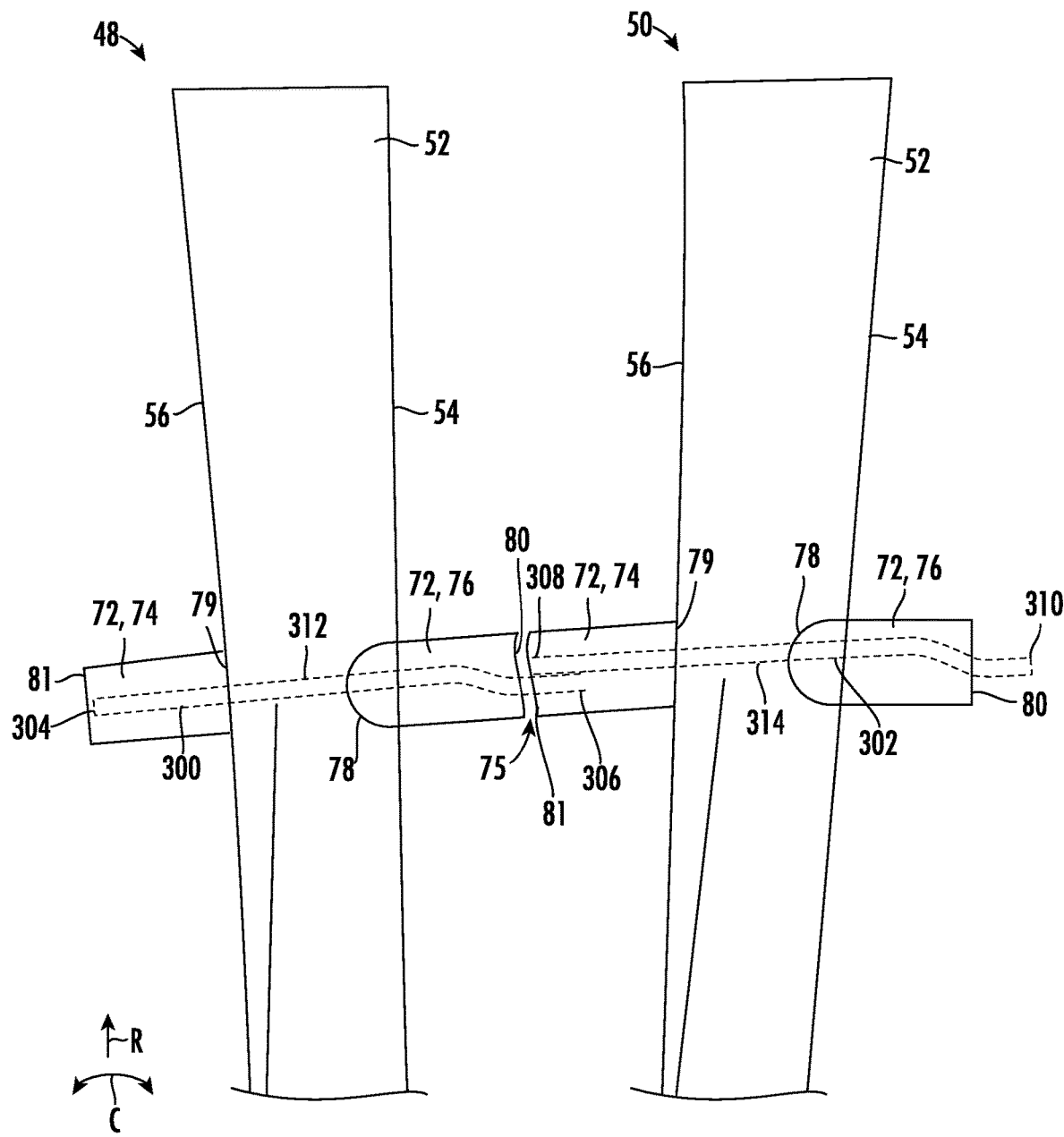
FIG. 12 illustrates an enlarged plan view of a rotor assembly having a first insert damper and a second insert damper, in accordance with embodiments of the present disclosure.

FIG. 12 illustrates a rotor assembly 45, in which the first rotor blade 48 and the second rotor blade 50 are positioned directly adjacent to one another, e.g., mounted directly next to one another on a rotor disk 46 such that no rotor blades are positioned between the first rotor blade 48 and the second rotor blade 50 (FIG. 2). As shown, the insert damper 300 may be a first insert damper 300 positioned within the first part-span shroud 72, and the rotor assembly may further include a second insert damper 302 positioned within the second part-span shroud 73. In exemplary embodiments, the first insert damper 300 and the second insert damper 302 may be housed within the part span shrouds 72, 73, such that they provide frictional damping to the rotor blades 48, 50, without being exposed to the combustion gases 34. Both the first insert damper 300 and the second insert damper 302 may be slidably movable relative to first part-span shroud 72, the second part-span shroud 73, and each other.

In particular embodiments, as shown, the first insert damper 300 may extend continuously through the airfoil 52 of the first rotor blade and across the interference joint 75, and the second insert damper 302 may extend continuously through the airfoil 52 of the second rotor blade 50. For example, the first insert damper 300 may extend continuously, i.e., without breaks or separations, within the first part-span shroud 72 and into the second part span shroud 73. For example, as shown, the first insert damper 300 may extend from a first end 304 disposed at the free end 81 of the suction side portion 76 of the first-part span shroud, through the airfoil 52 of the first rotor blade 48, across the interference joint 75, to a second end 306 disposed within the suction side portion 76 of the second part-span shroud 73. In this way, the first insert damper 300 may extend continuously between the first part span shroud 72 and the second part span shroud 73. Similarly, the second insert damper 302 may extend continuously, i.e., without breaks or separations, within the second part-span shroud 72. For example, as shown, the second insert damper 302 may extend from a first end 308 disposed at the free end 81 of the suction side portion 76 of the second-part span shroud, through the airfoil 52 of the second rotor blade 50, to a second end 310. Although only two rotor blades 48, 50 are depicted in FIG. 12, in a complete rotor assembly that extends circumferentially around the shaft 22 of the turbine 18, the part-span shroud of each rotor blade may include a insert damper that extends within the part-span shroud and into a neighboring part span shroud, such that the insert dampers form a circumferential ring around the shaft 22 of the turbine 18.

In many embodiments, as shown in FIG. 12, the first insert damper 300 may be in contact with, and overlap, the second insert damper 302. For example, the first end 308 of the second insert damper 302 may circumferentially overlap with the second end 306 of the first insert damper 300, such that a radially outer surface 312 of the first insert damper 300 contacts a radially inner surface 314 of the second insert damper 302. In this way, the insert dampers 300, 302 may be in movable contact with an interior surface the first part-span damper 72 and an interior surface of the second part-span damper 73, which allows the first insert dampers 300, 302 to leverage the relative movement between the part span shrouds 72, 73 to provide frictional damping to the rotor blades 48, 50. For example, the insert dampers 300, 302 are configured to advantageously reduce vibrations experienced by rotor blades 48, 50 during operation. For example, the insert dampers 300, 302 provide increased surface area in contact with the interior of both the part-span shrouds 72, 73, which advantageously increases the amount of frictional damping between the part-span shrouds 72, 73, thereby reducing the amount of potential damage causing vibrations to the rotor blades 48, 50. In addition, because the insert dampers 300, 302 are positioned within part span shrouds 72, 73, they do not create any blockages or impediments to the flow of combustion gases 34 over the airfoils 52.

Figure 13:
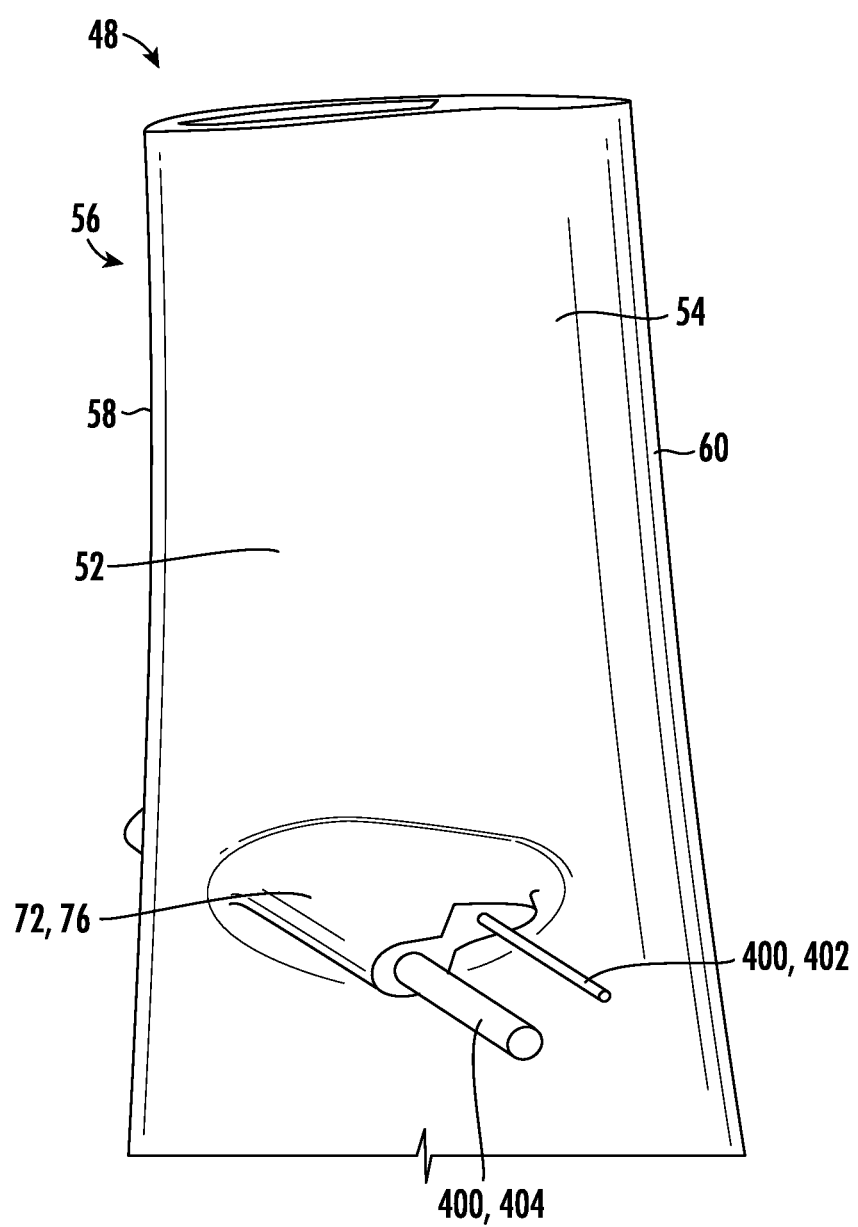
FIG. 13 illustrates a perspective view of a rotor blade having pin dampers, in accordance with embodiments of the present disclosure.

FIG. 13 illustrates a perspective view of a first rotor blade 48 having pin dampers 400 extending from the first part span shroud 72, and FIG. 14 illustrates a top-down view of a rotor assembly 45 having pin dampers 400 positioned within, and extending between, the first and second part-span shrouds 72, 73. As shown in FIGS. 13 and 14 collectively, the pin dampers 400 may be generally cylindrically shaped dampers that extend within and between the part span shrouds 72, 73, in order to frictionally dissipate vibrations between the rotor blades 48, 50. In many embodiments, the rotor assembly 45 may include a first pin damper 402 and a second pin damper 404. As shown in FIG. 13, the first pin damper 402 and the second pin damper may have different diameters, e.g., the first pin damper 402 may have a smaller diameter than the second pin damper 404. The first pin damper 402 and the second pin damper 404 may each be positioned within, and extend between, the first part span shroud 72 of the first rotor blade 48 and the second part span shroud 73 of the second rotor blade 50. As shown, each of the pin dampers 402, 404 may be in contact with both an interior surface of the first part-span shroud 72 and an interior surface of the second part span shroud 73, in order to leverage the relative movement between the part span shrouds 72, 73 and create frictional damping. In this way, the pin dampers 402, 404 are configured to advantageously reduce vibrations experienced by rotor blades 48, 50 during operation. For example, the insert dampers 402, 404 provide increased surface area in contact with the interior of both the part-span shrouds 72, 73, which advantageously increases the amount of frictional damping between the part-span shrouds 72, 73, thereby reducing the amount of potential damage causing vibrations to the rotor blades 48, 50. In addition, because the pin dampers 402, 404 housed within part span shrouds 72, 73, such that they do not create any blockages or impediments to the flow of combustion gases 34 over the airfoils 52.

Although the various dampers 100, 200, 300, 400 are described herein in the context of part-span shrouds 72, 73. It is envisioned to be within the scope of the invention that the dampers 100, 200, 300, 400 may be used on a tip-span shroud. For example, the dampers 100, 200, 300, 400 may be positioned on or within a tip-span shroud in order to provide increased vibrational damping without a significant loss in stiffness.

The dampers 100, 200, 300, 400 described herein have numerous advantages over prior designs. For example, the dampers 100, 200, 300, 400 all provide vibrational dampening to the rotor blades without a loss of stiffness, add minimal additional weight to the rotor assembly, and they can be easily replaced or repaired if worn. In addition, the dampers 100, 200, 300, 400 described herein can be easily tuned by adjusting the weight, provide little to no blockage to the flow of combustion gases over the rotor blades, and provide vibrational damping even when the part-span shrouds 72, 73 are not in contact with one another (such as in part-speed operating conditions). Furthermore, the dampers 100, 200, 300, 400 provide increased flexibility in the design of rotor blade shrouds due to the increased damping at low-part speed conditions. For example, the contact load between shrouds may have increased flexibility due to the dampers 100, 200, 300, 400.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade assembly for a turbomachine, the rotor blade assembly comprising:
   a first rotor blade and a second rotor blade positioned adjacent to one another, the first rotor blade and the second rotor blade each comprising:
   a platform; and
   an airfoil extending radially outward from a root coupled to the platform to a tip, the airfoil including a pressure side surface, a suction side surface, and a part-span shroud extending from the airfoil and disposed between the root and the tip, the part-span shroud having a pressure side portion extending from the pressure side surface and a suction side portion extending from the suction side surface, wherein the suction side portion of the part-span shroud of the first rotor blade and the pressure side portion of the part-span shroud of the second rotor blade form an interface joint with one another; and
   a first pin damper and a second pin damper each positioned within and extending between both the part span shroud of the first rotor blade and the part span shroud of the second rotor blade at the interface joint, wherein the first pin damper and the second pin damper are movable relative to the part span shroud of both the first rotor blade and the second rotor blade.

2. The rotor blade assembly as in claim 1, further comprising a sleeve damper in contact with an exterior surface of the part span shroud of the first rotor blade and an exterior surface of the part span shroud of the second rotor blade.

3. The rotor blade assembly as in claim 2, wherein the sleeve damper surrounds the suction side portion of the part-span shroud of the first rotor blade and the pressure side portion of the part-span shroud of the second rotor blade, and wherein the sleeve damper extends between the suction side surface of the first rotor blade and the pressure side surface of the second rotor blade.

4. A turbomachine, comprising:
   a compressor section;
   a combustor section;
   a turbine section;
   a rotor disk provided in one of the compressor section or the turbine section, a first rotor blade and a second rotor blade mounted on the rotor disk adjacent to one another, the first rotor blade and second rotor blade each comprising:
   a platform; and
   an airfoil extending radially outward from a root coupled to the platform to a tip, the airfoil including a pressure side surface, a suction side surface, and a part-span shroud extending from the airfoil and disposed between the root and the tip, the part-span shroud having a pressure side portion extending from the pressure side surface and a suction side portion extending from the suction side surface, wherein the pressure side portion of the part-span shroud of the first rotor blade and the suction side portion of the part-span shroud of the second rotor blade form an interface joint with one another; and
   a first pin damper and a second pin damper each positioned within and extending between the part span shroud of the first rotor blade and the part span shroud of the second rotor blade at the interface joint, wherein the first pin damper and the second pin damper are movable relative to the part span shroud of both the first rotor blade and the second rotor blade.

5. The turbomachine as in claim 4, further comprising a sleeve damper in contact with an exterior surface of the part span shroud of the first rotor blade and an exterior surface of the part span shroud of the second rotor blade.

6. The turbomachine as in claim 5, wherein the sleeve damper surrounds the suction side portion of the part-span shroud of the first rotor blade and the pressure side portion of the part-span shroud of the second rotor blade, and wherein the sleeve damper extends between the suction side surface of the first rotor blade and the pressure side surface of the second rotor blade.

7. The rotor blade as in claim 1, wherein the first pin damper defines a first constant diameter and the second pin damper defines a second constant diameter, and wherein the first constant diameter of the first pin damper is smaller than the second constant diameter of the second pin damper.

8. The turbomachine as in claim 1, wherein the suction side portion of the part-span shroud of the first rotor blade defines a recessed forward end and a protruded aft end, wherein the pressure side portion of the part-span shroud of the second rotor blade defines a protruded forward end and a recessed aft end.

9. The turbomachine as in claim 8, wherein the first pin damper extends from the recessed forward end of the suction side portion of the part-span shroud of the first rotor blade to the protruded forward end of the pressure side portion of the part-span shroud of the second rotor blade, and wherein the second pin damper extends from the protruded aft end of the suction side portion of the part-span shroud of the first rotor blade to the to the recessed aft end of the pressure side portion of the part-span shroud of the second rotor blade.

* * * * *